United States Patent

Persson et al.

[11] Patent Number: 5,906,855
[45] Date of Patent: May 25, 1999

[54] METHOD AND DEVICE FOR BAKING FOOD

[75] Inventors: Jonas Persson, Fristad; Lennart Larsson, Borås, both of Sweden

[73] Assignee: Sveba-Dahlen AB, Sweden

[21] Appl. No.: 08/875,455

[22] PCT Filed: Feb. 8, 1996

[86] PCT No.: PCT/SE96/00153

§ 371 Date: Jul. 29, 1997

§ 102(e) Date: Jul. 29, 1997

[87] PCT Pub. No.: WO96/24251

PCT Pub. Date: Aug. 15, 1996

[30] Foreign Application Priority Data

Feb. 9, 1995 [SE] Sweden .................................. 9500471

[51] Int. Cl.⁶ ................................. A21D 8/00; F27B 9/00
[52] U.S. Cl. .......................... 426/523; 99/443 R; 99/479; 126/41 A; 426/496; 432/138; 432/142; 432/162; 432/239
[58] Field of Search .................................... 426/523, 496; 99/443 R, 479; 432/137, 138, 142, 162, 239; 126/41 A; 34/187

[56] References Cited

U.S. PATENT DOCUMENTS

| 4,162,141 | 7/1979 | West ...................................... 99/443 R |
| 4,202,259 | 5/1980 | Johansson ............................. 99/443 R |
| 4,375,354 | 3/1983 | Henriksson .............................. 99/479 |
| 4,619,607 | 10/1986 | Schroder ............................... 99/443 R |

FOREIGN PATENT DOCUMENTS

| 0041287 | 12/1981 | European Pat. Off. . |
| 0112786 | 7/1984 | European Pat. Off. . |
| 0173005 | 3/1986 | European Pat. Off. . |
| 395595 | 8/1977 | Sweden . |

Primary Examiner—George Yeung
Attorney, Agent, or Firm—Barnes & Thornburg

[57] ABSTRACT

A method pertaining to the baking of products (B) in a baking oven (1) in which the products are supported by at least one rotary oven trolley (17) comprises rotating the trolley through a number of revolutions in one direction (R1) during the baking process, and thereafter reversing the direction of rotation and continuing rotation of the trolley through several revolutions in the opposite direction (R2) before again reversing the direction of rotation of the trolley. The trolley (17) keeps the same axial position in both directions of rotation. An arrangement for carrying out the method includes a drive device (20–26) for alternating rotation of the oven trolley through an equal number of revolutions in both directions during the baking process.

10 Claims, 3 Drawing Sheets

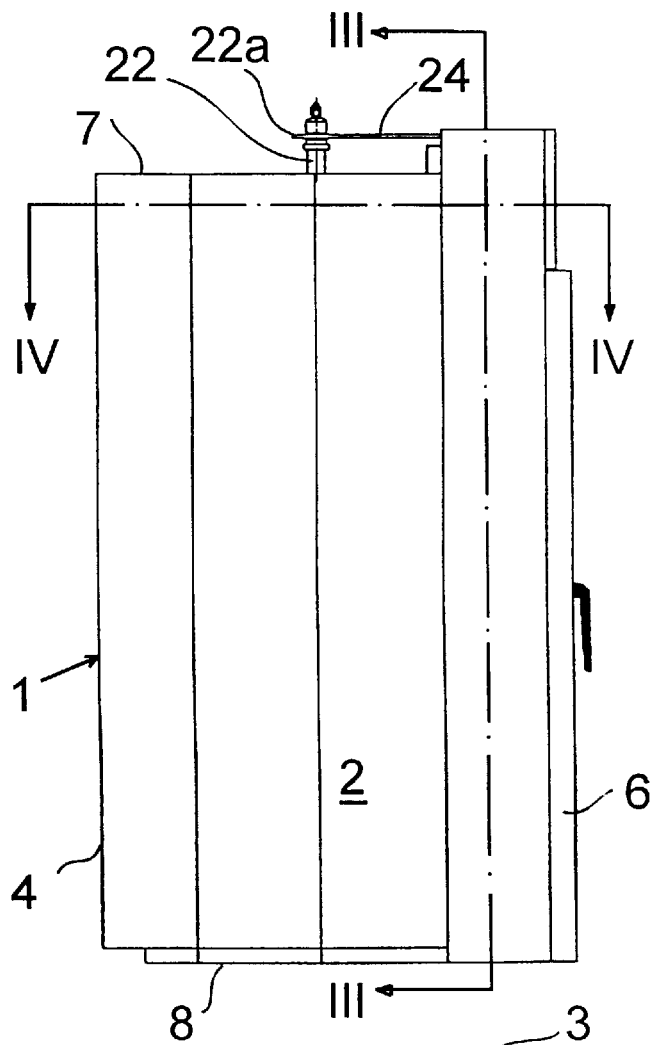
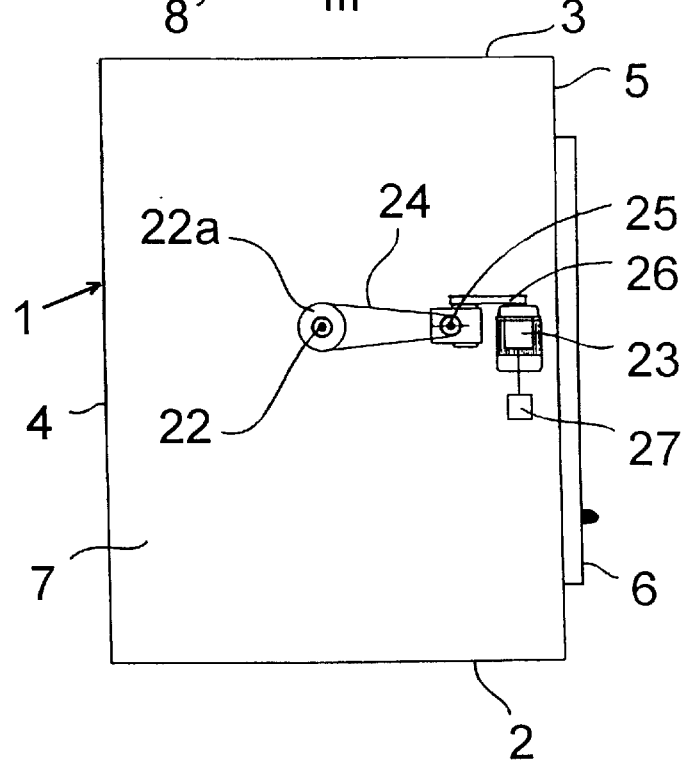

METHOD AND DEVICE FOR BAKING FOOD

TECHNICAL FIELD

The present invention relates to the baking of products in a baking oven, more particularly an oven of the kind in which the products are supported by at least one rotary oven trolley.

DESCRIPTION OF THE BACKGROUND ART

It is known, and generally common practice, to bake bread, buns, etc., in an oven wherein the bread, buns, etc., are supported in tiers on oven plates or oven sheets carried by an oven trolley which can be moved into and out of the oven. The trolley can be connected to floor-mounted or ceiling-mounted drive means for rotating the trolley slowly about its vertical centre axis. The trolley is rotated to obtain more uniform baking of the product, therewith obtaining a product of better quality than would otherwise be the case.

A baking oven of this kind is known from SE 395 595 and EP 112 786. When the trolley is to be removed from the oven, The rotational direction of the trolley is reversed so as to lower or lift the trolley in the process of removing the same. The trolley rotates in one direction during the actual baking process.

SUMMARY OF THE INVENTION

An object of the present invention is to improve still further the baking result in ovens provided with rotary trolleys. This object is achieved with the inventive method and inventive arrangement having the characteristic features set forth in the characterizing clauses of respective independent claims.

This reversal of the direction of trolley rotation further improves the evenness to which the product is baked. In the aforesaid patent publications, reversal of trolley rotation is effected during the baking process and is not effected with the aim of obtaining an improved baking result as a result of such reversal.

BRIEF DESCRIPTION OF THE DRAWINGS

FIG. 1 is a side view of a baking oven provided with an arrangement according to the present invention;

FIG. 2 illustrates the oven in FIG. 1 from above;

DESCRIPTION OF PREFERRED EMBODIMENTS

Figure 3:
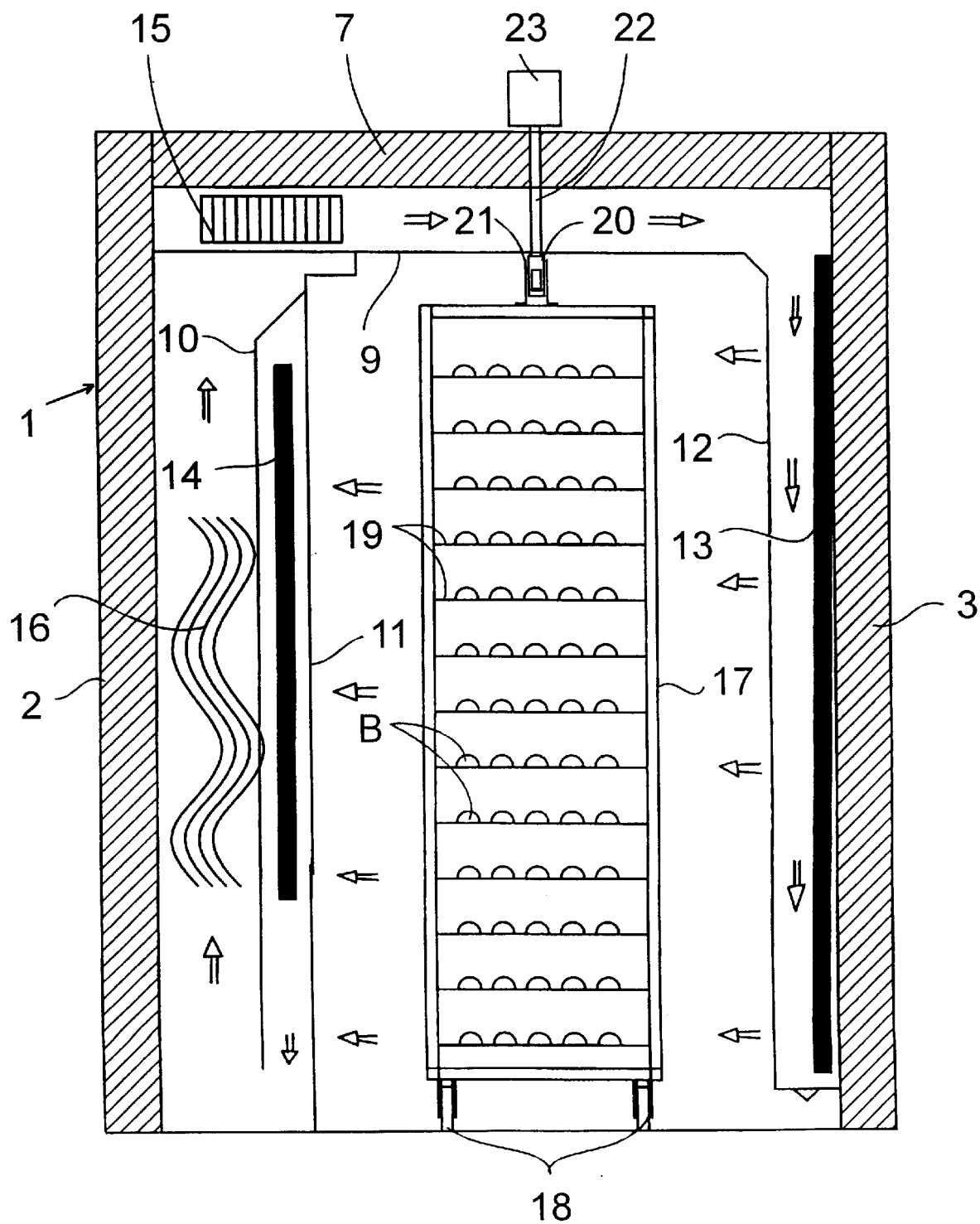
FIG. 3 is a longitudinal sectioned view of the oven shown in FIG. 1, taken on the line III—III.

There is shown a baking oven 1 which has two side walls 2 and 3, a back wall 4, a front wall 5, a door 6 fitted to the front wall, a roof 7 and a bottom 8. All parts 2–7 are heat insulated. The oven 1 further includes a ceiling 9, an inner wall 10, and two perforated inner walls 11 and 12. Mounted in the spaces between the walls 3, 12 and 10, 11 is a respective steam pack 13 and 14 which function to moisten the air within the oven, with hot steam. Mounted in the space between the oven roof 7 and the inner wall 9 is a fan 15 which forces the air in the oven 1 to flow in the paths illustrated by arrows in FIG. 1. A heat pack 16 for heating oven air is mounted between the side wall 2 and the inner wall 10. Connections to respective steam packs 13, 14, fan 15 and heat pack 16 have not been shown in the drawings since they are not required in obtaining an understanding of the invention. This also applies to ventilation openings.

An oven trolley 17 having wheels 18 that can also be rotated in the horizontal plane is shown inserted into the oven. The oven trolley 17 includes a frame which supports a plurality of baking sheets 19. FIG. 3 shows buns B placed on sheets 19. Mounted centrally in the upper part of the trolley 17 is a suspension roller 21. The roller 21 can be hooked onto a hook 20 which is connected to a shaft 22 that extends through the roof 7 and there connected to an electric motor 23 through the medium of a belt pulley 22a, which is fixedly mounted on the shaft 22, a toothed belt 24, a gear housing 25, and a toothed belt 26.

The motor 23 is reversible and is connected to a pulse counter 27 which counts the number of revolutions made by the motor 23 and when reaching a predetermined number of revolutions sends a pulse to the motor 23 and therewith cause the motor to rotate in the opposite. The pulse counter 27 is therewith set to zero and again begins to count the number of revolutions made by the motor 23 in this reversed direction. Subsequent to counting the same predetermined number of revolutions, the counter 27 sends a pulse to the motor 23, causing the direction of rotation to be again reversed.

Rotation of the motor 23 causes the oven trolley 17 to rotate about its vertical centre axis at a predetermined speed. Reversal of the direction of rotation of the motor 23 will also result in reversal of the direction of rotation of the oven trolley 17. It has been found suitable to reverse the direction of motor rotation subsequent to having rotated the oven trolley 17 through 2–15 revolutions, preferably about 5 revolutions, in each direction.

It will be understood that any other suitable counter may be used as an alternative to the pulse counter 27, such as a revolution counter, which is actuated by the shaft 22, for instance, and which causes the motor to reverse its direction of rotation subsequent to the shaft, and therewith the trolley 17, having rotated a predetermined number of revolutions. Alternatively, the motor 23 can be connected to a timing clock which functions to cause the motor 23 to change its direction of rotation subsequent to the passage of a predetermined time period, for instance 100 seconds, that has been set on the clock.

A motor which rotates in only one direction can be used as an alternative to a reversible motor 23, wherein there is arranged between the motor and the shaft 22 a mechanism which is actuated by impulses from, e.g., a pulse counter or a timing clock to reverse the rotational direction of the shaft 22.

The air heated by the heat pack 16 passes through the fan 15 and is forced downwards between the walls 3 and 12, where it is moistened by the steam pack 13, said pack normally delivering steam once on each baking occasion. The space between these walls constitutes the pressure side of the oven. The air is then forced through the holes in the wall 12 and passes between the sheets 19 carried by the rotating oven trolley 17, such as to bake the buns B. The air then passes through the holes in the wall 11 and is moistened by the steam pack 14, once with each baking occasion. The air then flows up between the walls 2 and 10, towards the heat pack 16. the space between the walls 11 and 2 constitutes the suction side of the oven.

Figure 4:
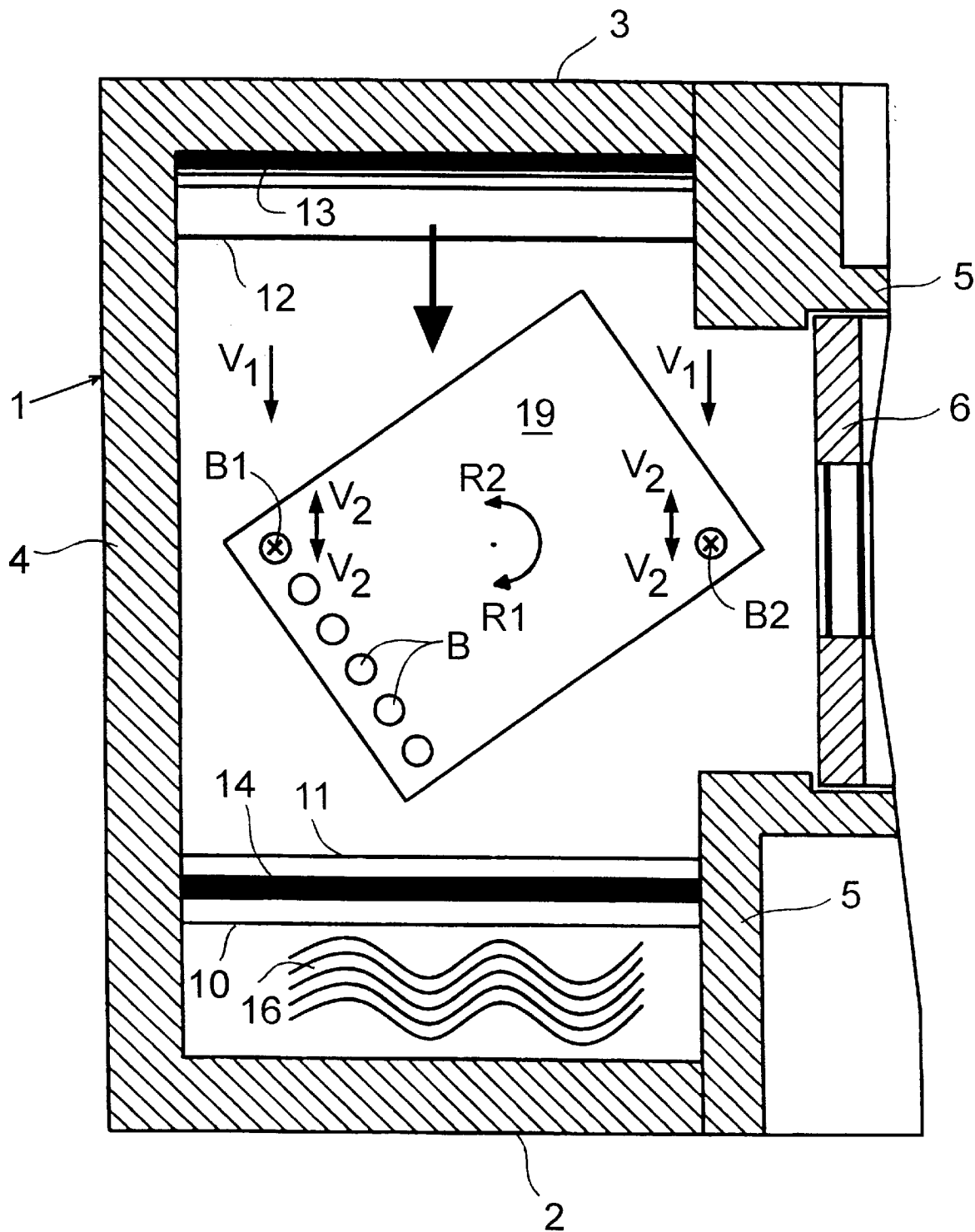
FIG. 4 is a cross-sectional view of the oven shown in FIG. 1, taken on the line IV—IV.

FIG. 4 shows from above a sheet 19 and a plurality of buns B supported thereby. The buns located furthest out in two corners are designated B1 and B2.

If it is assumed that the trolley 17 rotates in one single direction R1, that the peripheral speed of each bun B1, B2 will be V2, and that the hot, moist air passes between the sheets 19 at a speed of V1, then the bun B1 will be impinged upon at an air speed of V1+V2, whereas the bun B1 will be impinged upon at an air speed of V1−V2. This means that the bun B1 will be subjected to relatively large quantities of hot air with the result that the bun will be baked noticeably on the side thereof which faces forwardly in the direction of rotation. When the bun B1 reaches the position earlier occupied by the bun B2, the bun B1 will be subjected to relatively small quantities of hot air and the opposite side of the bun B1 will therefore be baked to a lesser extent. This means that one side of the bun B1 will either be baked sufficiently or excessively, and that its other side is insufficiently or sufficiently baked as the oven trolley rotates in one direction over a large number of revolutions. This naturally applies to all buns B on the sheets 19.

On the other hand, if the trolley 17 rotates in alternate directions through one and the same number of revolutions, the buns B will be baked equally on both sides. When the peripheral speed V2 of the buns B1 and B2 and the air speed V1 are equally as great in both directions of rotation R1 and R2, one side of each bun B1 and B2 will be impinged upon at an air speed of (V1+V2+(V1−V2) in the direction R1, and the opposite side of the same bun will be impinged upon at an air speed of (V1−V2+(V1+V2) in direction R2. These air speeds are mutually identical, meaning that the air flowing between the sheets will have the same effect on both sides of the buns B when the trolley 17 rotates through the same number of revolutions in each rotational direction, and therewith provide a uniform baking result.

Although the invention has been described and illustrated with reference to only one embodiment together with some alternatives, it will be understood that the invention is not restricted hereto and that the invention is only limited by the scope of the following claims.

We claim:

1. A method of baking food (B) in an oven (1) in which the food is supported by at least one rotary oven trolley (17), the method comprising the steps of rotating the trolley (17) through at least part of one revolution in a first direction (R1), then reversing the rotational direction, then rotating the trolley (17) through at least part of one revolution in a second and opposite direction (R2), then reversing the direction of rotation again, wherein rotation in both the first and second directions and the reversals in rotational directions take place during the baking process, and wherein the oven trolley retains the same axial position during rotation in both the first and second directions.

2. A method according to claim 1 wherein the steps of rotating the trolley through at least part of one revolution in the first direction, then reversing the rotational direction, then rotating the trolley through at least part of one revolution in the second direction, then reversing the direction of rotation again together comprise rotation in the first direction (R1) through the same number of revolutions as rotation in the second direction (R2).

3. A method according to claim 1 wherein the steps of rotating the trolley through at least part of one revolution in the first direction, then reversing the rotational direction, then rotating the trolley through at least part of one revolution in the second direction, then reversing the direction of rotation again together comprise rotating the oven trolley in one of the first and second directions (R1, R2) through 2–15 revolutions.

4. An arrangement for baking food (B) in a baking oven (1) in which the food is supported by at least one rotary oven-trolley (17), wherein the oven has a pressure side from which hot air flows towards the trolley, and an opposing suction side to which air flows after heating the food, and wherein the arrangement includes drive means (20–26) for rotating the trolley in a first direction, means for actuating the drive means to reverse the direction of rotation of the trolley to rotate the trolley in a second and opposite direction during the baking of the food in the baking oven; and wherein the oven trolley retains the same axial position in both the first and second directions of rotation.

5. An arrangement according to claim 4 wherein the drive means (20–26) includes a motor (23) mounted on one of the oven roof (7) and the oven floor (8).

6. An arrangement according to claim 5 wherein the motor (23) is a reversible motor.

7. An arrangement according to claim 4 further comprising means (27) for causing the drive means (20–26) to reverse the direction of rotation (R1, R2) of the trolley (17) subsequent to at least one of a predetermined time period and a predetermined number of revolutions.

8. A method according to claim 2 wherein the steps of rotating the trolley through at least part of one revolution in the first direction, then reversing the rotational direction, then rotating the trolley through at least part of one revolution in the second direction, then reversing the direction of rotation again together comprise rotating the oven trolley in one of the first and second directions (R1, R2) through 2–15 revolutions.

9. An arrangement according to claim 5 further comprising means (27) for causing the drive means (20–26) to reverse the direction of rotation (R1, R2) of the trolley (17) subsequent to at least one of a predetermined time period and a predetermined number of revolutions.

10. An arrangement according to claim 6 further comprising means (27) for causing the drive means (20–26) to reverse the direction of rotation (R1, R2) of the trolley (17) subsequent to at least one of a predetermined time period and a predetermined number of revolutions.

* * * * *